(12) United States Patent
Wessel et al.

(10) Patent No.: US 6,604,440 B2
(45) Date of Patent: Aug. 12, 2003

(54) SWITCH FOR A BICYCLE

(75) Inventors: Robert Wessel, Wurzberg (DE); Georg Blaschke, Geldersheim (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/945,911

(22) Filed: Sep. 4, 2001

(65) Prior Publication Data

US 2002/0035884 A1 Mar. 28, 2002

(30) Foreign Application Priority Data

Sep. 5, 2000 (DE) .......................... 100 43 612

(51) Int. Cl.⁷ .............................. F16C 1/10; G05G 13/00
(52) U.S. Cl. ..................... 74/502.2; 74/475; 74/489; 74/505; 74/506; 74/527
(58) Field of Search ................. 74/502.2, 475, 74/489, 505, 506, 527, 528

(56) References Cited

U.S. PATENT DOCUMENTS

| 3,972,247 | A |   | 8/1976  | Armstrong ............... 74/489 |
|-----------|---|---|---------|--------------------------------|
| 4,876,913 | A | * | 10/1989 | Romano .................. 74/535 |
| 5,476,019 | A | * | 12/1995 | Cheever et al. ............ 74/506 |
| 5,524,501 | A | * | 6/1996  | Patterson et al. .......... 74/475 |
| 5,615,580 | A | * | 4/1997  | Chen et al. ............... 74/475 |
| 5,732,598 | A | * | 3/1998  | Shoge et al. .............. 74/475 |
| 6,209,413 | B1 |  | 4/2001  | Chang ..................... 74/502 |
| 6,216,553 | B1 | * | 4/2001 | Wessel et al. ............. 74/502.2 |
| 6,367,347 | B1 | * | 4/2002 | Blaschke et al. ........... 74/502.2 |
| 2001/0027906 | A1 | * | 10/2001 | Assel .................... 192/46 |
| 2002/0000136 | A1 | * | 1/2002  | Feng et al. ............... 74/502.2 |

FOREIGN PATENT DOCUMENTS

| DE | 25 42 373      | 4/1976  | ............ G05G/7/02 |
| DE | 90 15 515.7    | 11/1990 | ............ B62M/25/04 |
| DE | 199 18 520     | 2/2000  | ............ B62M/25/04 |
| EP | 0647557 A2 *   | 12/1995 | ............ 74/502.2 |
| GB | 2 012 893      | 3/1979  | ............ B62M/25/04 |

* cited by examiner

Primary Examiner—Vinh T. Luong
(74) Attorney, Agent, or Firm—Milan Milosevic; Lisa Wunderlich

(57) ABSTRACT

A switch for actuating a gear on a bicycle includes a housing with an inner toothing formation, a grip part and a rotary part with a cable drum for a fraction cable. The grip part having an integrally formed section for actuating an elastic element on the rotary part so that when the grip part is rotated in a switching direction which releases the traction cable the elastic element is pretensioned until a disengagement member on the grip part disengages a pawl on the rotary part which interacts with the inner tooting formation in the housing. Both the pawl and the elastic element are connected integrally to the rotary part resulting in advantage in terms of the production and assembly of the switch.

10 Claims, 4 Drawing Sheets

SWITCH FOR A BICYCLE

BACKGROUND OF THE INVENTION

1. Field of the Invention

The invention relates to a switch for actuating a gear on a bicycle.

2. Description of the Related Art

A known switch for actuating a gear on a bicycle is disclosed by German Patent Application No. 198 35 118.6, published as earlier priority No. 199 18 520.4. This switch comprises a housing for fastening the switch on the bicycle and a grip element for actuating the switch. The switch also includes a rotary element and a cable-storage device, in particular a winding drum for winding up a cable for actuating the gear. The rotary element is connected to the winding drum and has at least one detent pawl which engages in a latching toothing formation in the housing. The advantage here is that a carry-along element on the grip element carries along the rotary element directly in a tensioning direction and the movement of the rotary element in the opposite rotational direction, namely in the release direction of rotation, is brought about by the detent pawl being released. In the release direction of rotation, a spring element pretensions the rotary element, with the result that the switching operation takes place in an accelerated manner. The spring element comprises a spiral spring which is positioned under pretensioning in a groove in the rotary element and is actuated by a carry-along element on the grip element.

SUMMARY OF THE INVENTION

It is an object of the present invention to provide a switch which has improved functioning and comprises only a small number of parts, the intention being to reduce the production costs in relation to the known switch configurations.

The switch according to the present invention includes a housing, a grip element, a rotary element, and a cable drum. The housing has a pawl for retaining the individual gear stages relative to the housing. The switch according to the present invention further includes an improved spiral-spring solution insofar as an elastic element is connected integrally to a rotary part and interacts with a contour of an integrally formed section on a grip part. In addition to having cost advantages, such a simplified configuration of the switch allows simplified assembly of the switch. Furthermore, the rotary part is connected to the cable drum which can wind up a traction cable, which produces the connection to the gear of the bicycle, by virtue of rotation on the grip part.

The elastic element is preferably a spiral spring with a free resilient end which is of concavely curved configuration. The contour of the grip part engages in the concave curve of the spiral spring and pretensions the spiral spring when the grip part is rotated in the cable release direction. The contour slides on the free curve of the spiral spring when to grip part is rotated in the cable release direction such that the rotary part is displaced in an accelerated manner in the release direction of rotation once a disengagement means has disengaged the pawl and cleared the path for the rotary part to move to the next gear stage. In the switching direction in which the traction cable is tensioned, the rotary part is carried along directly by the grip part by the interaction of flanks to the next gear stage which is defined by the pawl latching into the latching toothing formation of the housing.

A functionally similar variant of an elastic element interacting with an integrally formed section is likewise a spiral spring with radially outwardly directed convex curvature and resilient end which is of bulbous configuration and butts under pretensioning against a socket of the integrally formed section on the grip part. When the grip part is actuated in the switching direction in which the traction cable is released, the convex curve of the spiral spring is bent, with a bulge being formed in the process, until the above-mentioned disengagement means releases the pawl for gear-changing purposes. The advantage of this solution is the interaction of the bulbous resilient end with the socket on the integrally formed section of the grip part. The socket may be configured such that a rolling movement, which is more or less free of friction, is produced there when the grip part is rotated in the switching direction in which the traction cable is released.

Finally, the invention proposes a further embodiment of an elastic element which, once again, is a spiral spring. In this embodiment, the spiral spring has at least one turn and an insertable resilient end which can be fastened in a rotatable, but form-fitting, manner in a receiving means of an integrally formed section on the grip part. It is advantageous here to use a plug-in connection, which can be inserted as early as during assembly of the switch. The advantage of this variant, in addition to the reliability of assembling the switch, resides in its low friction during actuation even under difficult lubrication conditions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
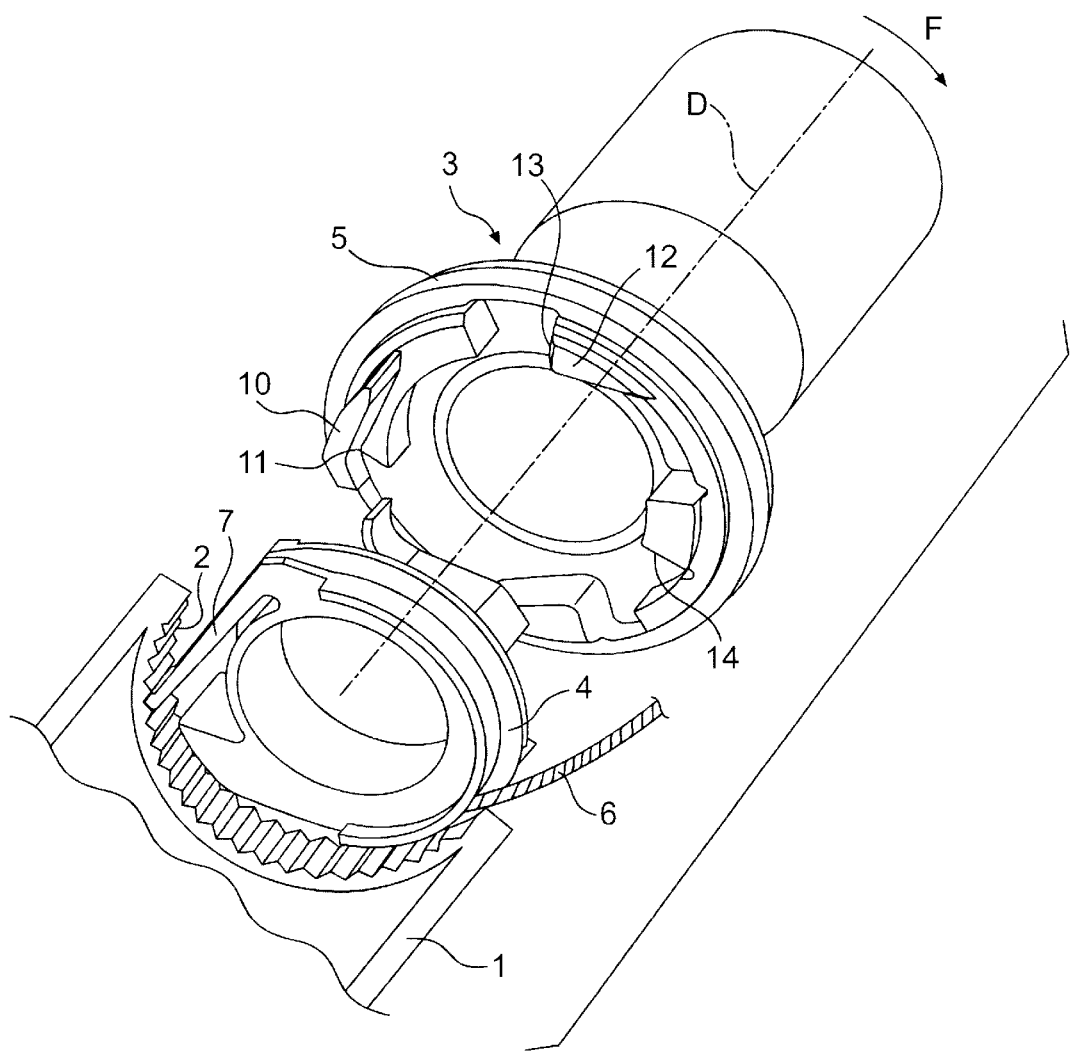
FIG. 1 is a perspective illustration of a switch according to an embodiment of the present invention comprising a grip part and a rotary part with a cable drum in a housing.

FIG. 1 shows a switch for actuating a bicycle gear having a housing 1 which may be fastened on the bicycle, in particular on the handlebar of the bicycle. The housing 1 is designed to accommodate a rotary part 4 which has a cable drum 5 around which a traction cable 6 wraps, the traction cable 6 being fastened on the bicycle gear by one end and on the cable drum 5 by the other end. The housing 1 also has an inner toothing formation 2 arranged on an inner circumference of the housing 1. A pawl 7 arranged integrally on the rotary part 4 interacts resiliently against the inner toothing formation 2 with blocking action in a cable release switching direction S, in which the traction cable 6 is released. The inner toothing formation 2 has teeth which are spaced apart from one another by spacings which preferably each make up a gear stage of the bicycle gear. With the rotary part 4 installed in the housing 1 as described above, the rotary part 4 can thus only rotate in a cable tensioning switching direction F, in which the traction cable 6 is tensioned, in which case the pawl 7 runs over the inner toothing formation 2. If the rotary part 4 is required to rotate in the cable release switching direction S, then the pawl 7 must first be disengaged from the inner toothing formation 2. The cable drum 5 is subjected to a torque which the traction cable 6 produces from the bicycle gear. If the pawl 7 is thus disengaged, the rotary part 4, along with the cable drum 5, then rotates further in the cable release switching direction S.

Figure 2:
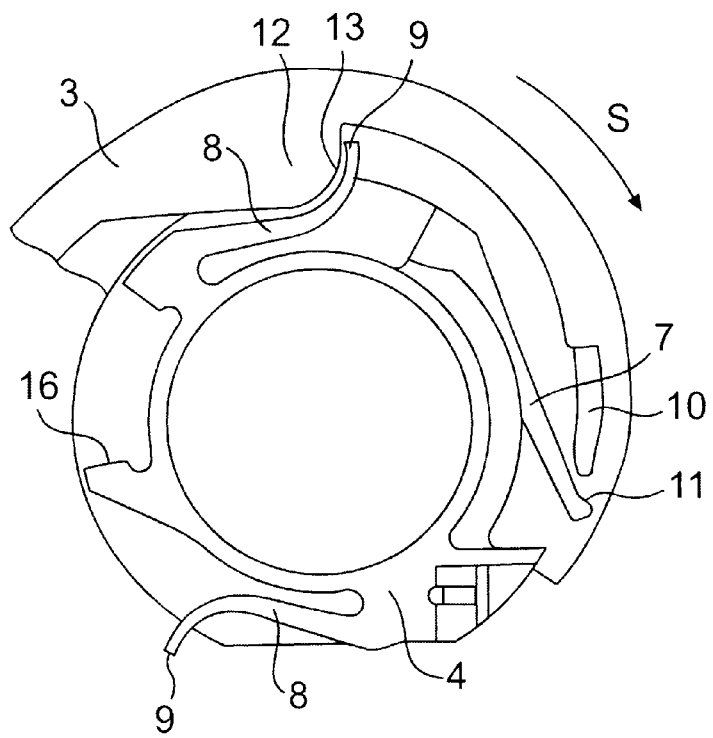
FIG. 2 is a partial side view of the rotary part and the grip part along with the illustration of a contour on the grip part, which interacts with an elastic element on the rotary part.
Figure 3:
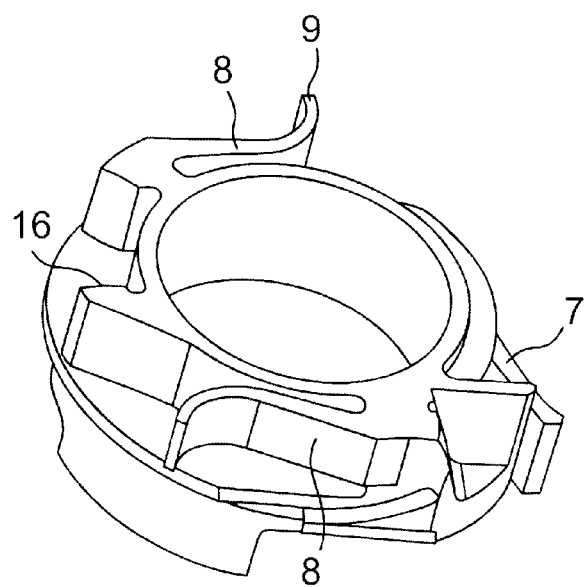
FIG. 3 is a perspective view of the rotary part with a concavely outwardly curved spiral spring, which is arranged integrally on the rotary part, as the elastic element.

According to FIGS. 1–3, an elastic element 8 is connected integrally to the rotary part 4. The elastic element 8 comprises a spiral spring with a resilient end 9. The spiral spring is of radially outwardly concave configuration and thus forms a curve.

The rotary part 4 is assigned a grip part 3 which has a disengagement means 10 with a nose 11 and an integrally formed section 12 with a contour 13. The contour 13 interacts with the curve of the elastic element 8 when the grip part 3 is rotated in the cable release switching direction S. The contour 13 of the integrally formed section 12 slides along the curve of the elastic element 8 and produces pretensioning of the rotary part 4 until the pawl 7 is disengaged by the disengagement means 10. Once the pawl 7 is disengaged, the pretensioning allows the rotary part 4 to move to the next gear stage.

Figure 4:
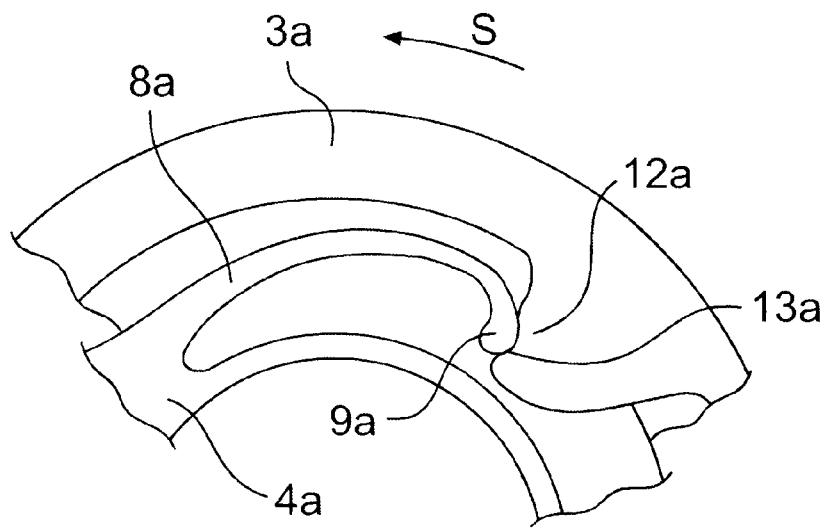
FIG. 4 is a partial side view of a rotary part and a grip part according to a further embodiment of the invention with a convex radially outwardly curved spiral spring with a bulbous resilient end in a socket on an integrally formed section on the grip part.

FIG. 4 shows a further embodiment of an elastic element 8a which is integrally connected to a rotary part 4a and comprises a spiral spring which is radially outwardly convexly curved and has a resilient end 9a which is of bulbous configuration. The resilient end 9a butts under pretensioning in a socket 13a against an integrally formed section 12a of a grip part 3a.

Figure 5:
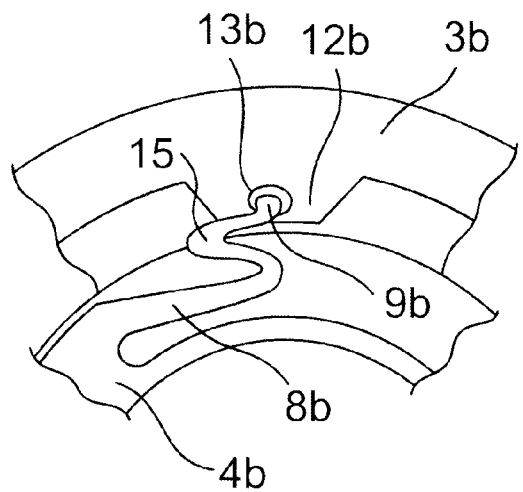
FIG. 5 is a partial side view of a rotary part and a grip part according to yet another embodiment of the present invention with a spiral spring with turns and a resilient end which is inserted in a rotatable and form-fitting manner in an integrally formed section on the grip part.

According to FIG. 5, yet a further embodiment of an elastic element 8b connects a rotary part 4b to a grip part 3b. The elastic element 8b is a spiral spring with at least one turn 15 and includes a resilient end 9b which is mounted in a rotatable, but form-fitting, manner in a receiving means 13b of an integrally formed section 12b on the grip part 3b.

The advantages of the embodiments according to FIGS. 4 and 5 have already been described. In each of the embodiment, switching in the cable tension switching direction F in which the traction cable 6 is tensioned is accomplished as follows: a first flank 14 on the grip part 3, 3a, 3b ensures that the rotary part 4, 4a, 4b is carried along via a second flank 16 arranged on the rotary part 4, 4a, 4b.

Finally, it is proposed to arrange on the circumference of the rotary part 4, 4a, 4b not just one elastic element 8, 8a, 8b, but at least two elastic elements in an arrangement in which they are symmetrical in relation to an axis of rotation D (see FIG. 2). This arrangement on the same circumference also requires the elastic elements 8, 8a, 8b to be spaced apart from one another by approximately equal spacings. The reason for this is the avoidance of free radially outwardly directed forces, which could cause additional friction.

Figure 6:
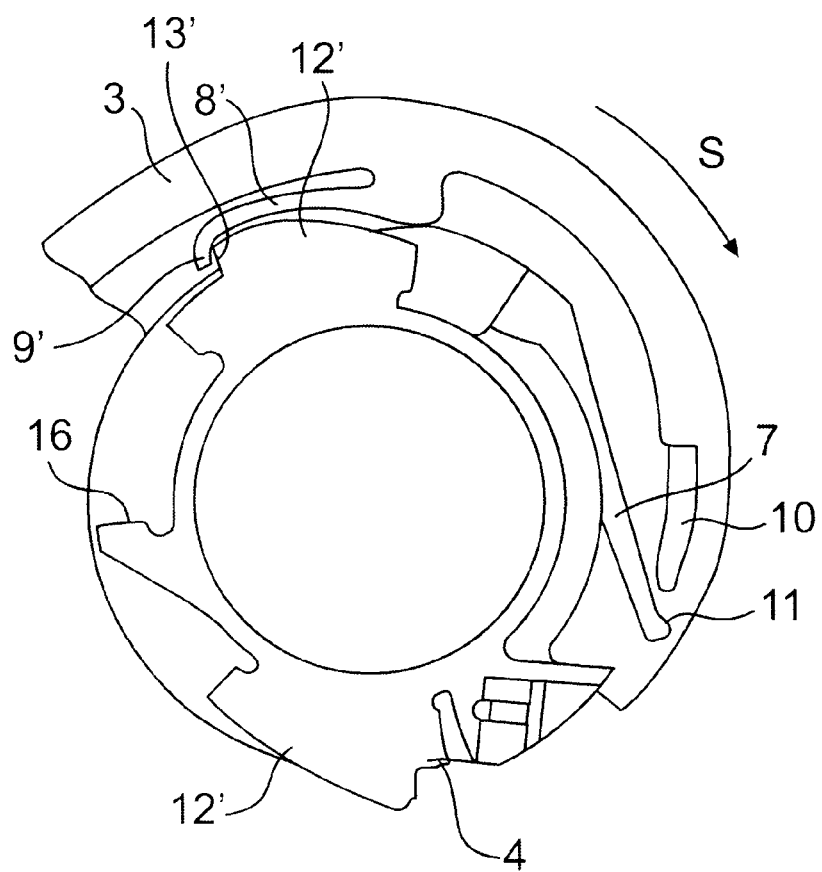
FIG. 6 is a side view of the rotary part and greip part of a further embodiment of the present invention in which the elastic element is connected to the grip part and the rotary part has the contour.

FIG. 6 shows an alternative embodiment of the present invention in which an elastic element 8' with a resilient end 9' is arranged on the grip part 3 and the integrally formed part 12' with a contour 13' is arranged on the rotary part. This embodiment is similar to the embodiment of FIG. 2. Of the course the positions of the elastic elements 8a and 8b and sections 12a and 12b in FIGS. 4 and 5 could similarly be reversed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A switch for actuating a gear on a bicycle, comprising:

a housing having an inner tooth formation;

a rotary part and a cable drum on which a traction cable is mountable;

a grip part;

a pawl arranged for engaging said inner toothing formation;

a disengagement means for selectively disengaging said pawl from said inner toothing formation; and at least one elastic element arranged between said rotary part and said grip part, a first one of said grip part and said rotary part including said at least one elastic element and a second one of said grip part and said rotary part including an integrally formed section having a contour that presses against said at least one elastic element producing a pretension during rotation of said grip part relative to said rotary part in a traction cable release direction prior to disengagement of said pawl by said disengagement means.

2. The switch of claim 1, wherein said elastic element is connected to said grip part.

3. The switch of claim 1, wherein said elastic element is connected to said rotary part.

4. The switch of claim 1, wherein said grip part comprises said integrally formed section.

5. The switch of claim 1, wherein said grip part comprises said integrally formed section having a socket which presses against said elastic element and deflects said elastic element, thereby producing a pretension during the rotation of said grip part relative to said rotary part in a traction cable release switching direction prior to the disengagement of said pawl by said disengagement means.

6. The switch of claim 5, wherein said elastic element comprises a resilient end that rolls in said socket when said elastic element is deflected by said socket without friction being produced.

7. The switch of claim 1, wherein said elastic element comprises a resilient end and said grip part comprises said integrally formed selection having a receiving member which receives said resilient end, said receiving member presses against said resilient end and deflects said elastic element, thereby producing a pretension during the rotation of said grip part relative to said rotary part in a traction cable release switching direction prior to the disengagement of said pawl by said disengagement means.

8. The switch of claim 7, wherein said elastic element comprises a spiral spring with at least one turn and said resilient end is fastened in a rotatable and form-fitting connection in said receiving means.

9. The switch of claim 1, wherein said at least one elastic element comprises a plurality of elastic elements arranged such that they are evenly spaced in a circumferential direction around said axis of rotation to avoid outwardly directed force vectors.

10. The switch of claim 9, wherein said plurality of elastic elements comprises two elastic elements are arranged such that they are located approximately opposite one another relative to said axis of rotation.

* * * * *